(12) United States Patent
Subramanyan et al.

(10) Patent No.: US 9,407,769 B1
(45) Date of Patent: *Aug. 2, 2016

(54) PROVIDING A CUSTOMIZED VOICEMAIL-RETRIEVAL ANNOUNCEMENT

(71) Applicant: SPRINT COMMUNICATIONS COMPANY L.P., Overland Park, KS (US)

(72) Inventors: Badri Subramanyan, Overland Park, KS (US); Ayodeji Abidogun, Overland Park, KS (US); William Routt, Leawood, KS (US); Piyush Upadhyay, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/729,199

(22) Filed: Dec. 28, 2012

Related U.S. Application Data (63) Continuation of application No. 12/476,453, filed on Jun. 2, 2009, now Pat. No. 8,379,807.

(51) Int. Cl.
*H04M 3/533* (2006.01)

(52) U.S. Cl.
CPC .................... *H04M 3/53333* (2013.01)

(58) Field of Classification Search
USPC ............................ 379/88.16, 88.17
See application file for complete search history.

(56) References Cited

U.S. PATENT DOCUMENTS

2006/0262912 A1* 11/2006 Caputo ............... H04M 3/4931
 379/88.19
2008/0215323 A1* 9/2008 Shaffer ............... H04M 3/5335
 704/246

* cited by examiner

*Primary Examiner* — Amal Zenati (57) ABSTRACT

Ways of presenting a custom greeting to a user who retrieves a voicemail that was left by a caller are disclosed. In one embodiment, a voicemail server facilitates storing a voicemail in connection with an identifier that is associated with a calling device that was used by a caller in an attempt to call the user. A user-specific name is automatically retrieved based on the identifier. This name can be retrieved from the user's mobile device or from a remote address book. When the user retrieves his or her messages, the voicemail server presents a custom announcement introducing the message, where the custom announcement is based on the name retrieved.

20 Claims, 7 Drawing Sheets

PROVIDING A CUSTOMIZED VOICEMAIL-RETRIEVAL ANNOUNCEMENT

This application is a continuation of U.S. patent application Ser. No. 12/476,453, filed Jun. 2, 2009, which is herein incorporated by reference in the entirety.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, an ability for enabling a voicemail server to provide a customized greeting to a voicemail retriever, the greeting customized based on a user's identification of the caller (message leaver). Instead of hearing a generic sort of "first new message, . . . ," a user would receive an indication of the caller based on how the user has personally identified the caller, along the lines of "new message from Joe Smith [or whatever custom string had been established] . . . . "

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CDMA Code Division Multiple Access
GIS Geographic (Geospatial) Information System
GPRS General Packet Radio Service
GSM Global System for Mobile communications
I/O Input/Output
LED Light Emitting Diode
MAC Media Access Control
PDA Personal Data Assistant
PDSN Packet Data Serving Node
POTS plain old telephone service
TDMA Time Division Multiple Access
VoIP Voice Over Internet Protocol
Wi-Fi Wireless Fidelity Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
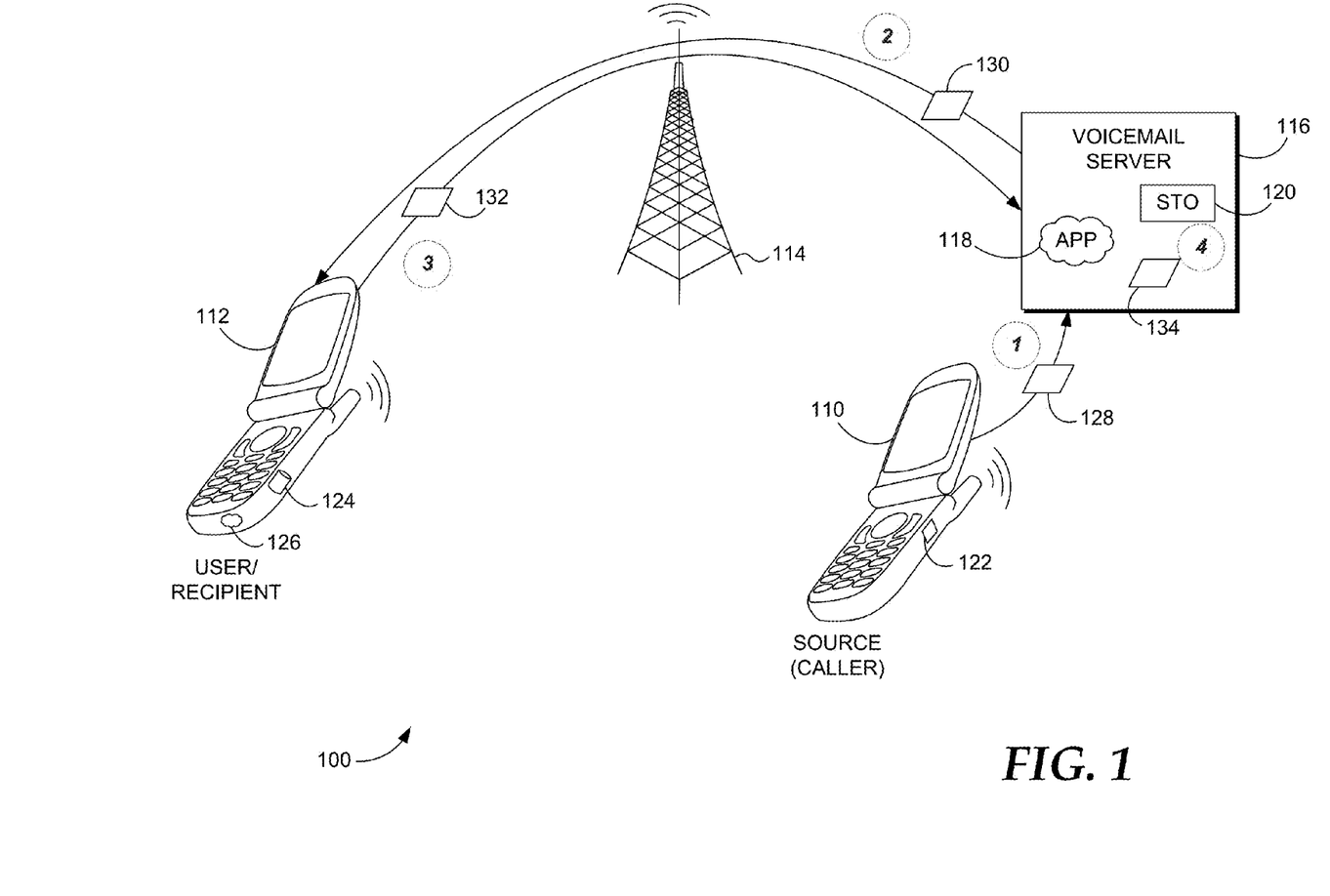
FIG. 1 depicts an illustrative operating environment suitable for practicing an embodiment of the present invention.

Turning now to FIG. 1, an illustrative operating environment suitable for practicing an embodiment of the invention is provided generally and referenced by the numeral 100. To help place the invention in context, we will describe an illustrative scenario in which a source calling device 110 (a caller) attempts to reach a recipient or user 112. Thus, a person using source device 110 will end up leaving a voicemail message for the owner of device 112, which we will variously refer to as a "user." In one embodiment, user device 112 is adapted to communicate by way of a wireless telecommunications network, which is symbolically represented by base transceiver station 114. An illustrative mobile communications device 112 is provided in FIG. 2, which we will briefly discuss.

Figure 2:
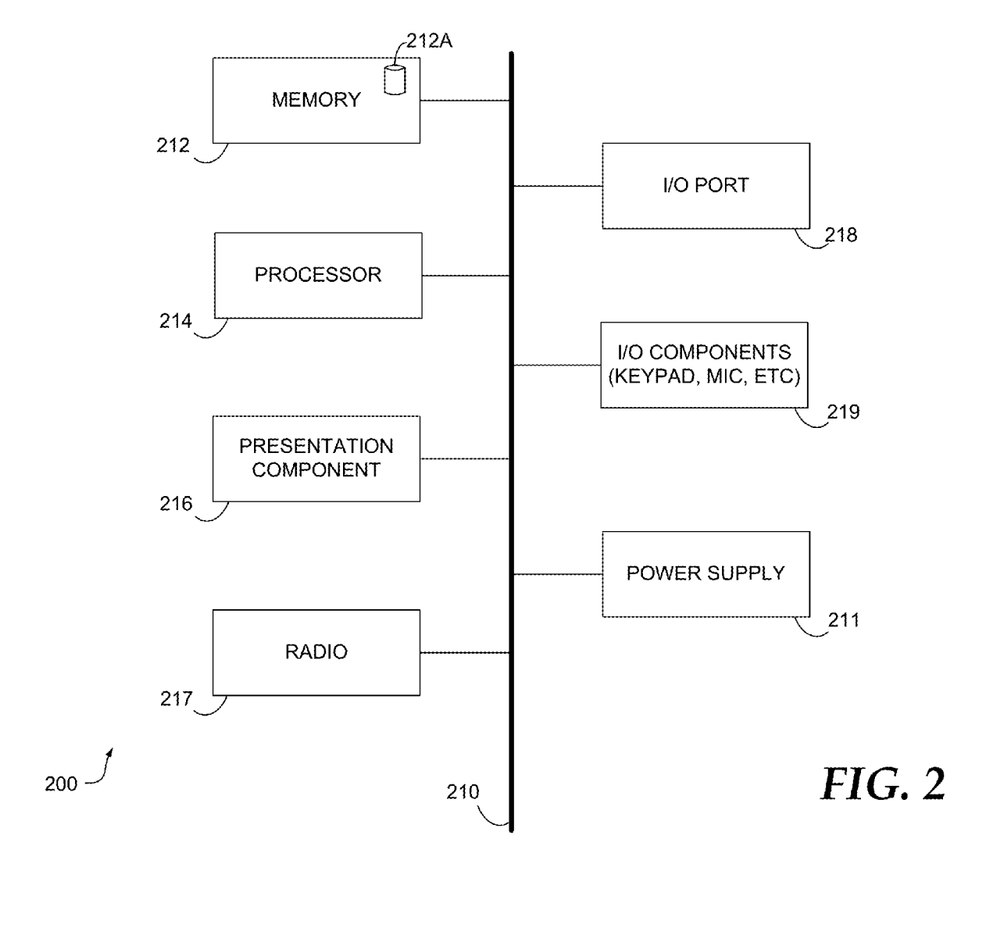
FIG. 2 depicts an illustrative mobile device suitable for practicing an embodiment of the present invention.

Turning now to FIG. 2, a block diagram of an illustrative mobile computing device ("mobile device") is provided and referenced generally by the numeral 200. Although some components are shown in the singular, they may be plural. For example, mobile device 200 might include multiple processors or multiple radios, etc. As illustratively shown, mobile device 200 includes a bus 210 that directly or indirectly couples various components together including a power supply 211, memory 212, a processor 214, a presentation component 216, a radio 217, input/output ports 218, and input/output components 219.

We previously have described various memory components that memory 212 might have. Thus, we will not elaborate more here, only to say that memory component 212 can include any type of medium that is capable of storing information. Processor 214 might actually be multiple processors that receive instructions and process them accordingly. Presentation component 216 includes the likes of a display, a speaker, as well as other components that can present information (such as a lamp (LED), or even lighted keyboards).

Radio 217 represents a radio that facilitates communication with a wireless telecommunications network. Illustrative wireless telecommunications technologies include CDMA, GPRS, TDMA, GSM, and the like. In some embodiments, radio 217 might also facilitate other types of wireless communications including Wi-Fi communications and GIS communications.

Input/output port 218 might take on a variety of forms. Illustrative input/output ports include a USB jack, stereo jack, infrared port, proprietary communications ports, and the like. Input/output components 219 include items such as keypads, microphones, touch screens, and any other item usable to directly or indirectly input data into mobile device 210. Power supply 211 includes items such as batteries, fuel cells, or any other component that can act as a power source to power mobile device 210.

Returning to FIG. 1, calling device 110 does not need to be a mobile device that is capable of communicating by way of a wireless telecommunications network. Rather, calling device 110 might take the form of any calling device that is capable of being used to make a telephone call. For example, calling device 110 might be a conventional telephone that utilizes the plain old telephone service (POTS) network, a VOIP phone, a mobile phone, a satellite phone, or any other phone that is usable to attempt to reach a target recipient.

A voicemail server 116 is also provided. Voicemail server 116 is responsible for facilitating reception and storage of voicemails intended for user 112. Voicemail server 116 can take the form of a computer or any other computing device that can run an application 118, which takes the form of a set of computer-executable instructions that carry out the various functional aspects that will be described in greater detail below. In one embodiment, voicemail server 116 includes a storage component 120, which may be internal or external to voicemail server 116. Storage component 120 stores the various voicemail information associated with a user's voicemail.

Source calling device 110 includes an identifier 122 that is usable to uniquely identify device 110. Identifier 122 might take the form of a phone number, or, if applicable, a mobile device number (MDN), an electronic serial number (ESN), a MAC address, or any other identifier that is uniquely associated with source calling device 110.

Source device 112 includes an address book 124 as well as an application 126. Address book 124 stores a set of contacts or other address-book information. Illustrative contact information might include a list of names with corresponding phone numbers. These are user defined in one embodiment. That is, the owner of device 112 provides the information in address book 124. Thus, for example, a user is free to associate any desired name with a phone number. The name associated might not be the actual name of the person associated with the phone number. For example, if "Michael Smith" is associated with phone number "816-555-1212," then a user of device 112 might store "my best friend" in connection with "816-555-1212."

Some users very much enjoy being able to personalize various aspects of their life. This ability to personalize contact information is a factor considered in embodiments of the present invention. As we will ultimately describe in greater detail, device 112 is usable to retrieve voicemail left for its owner (or another device could be used to retrieve the voicemail). We will describe a way in which the greeting that is presented to a user will be personalized according to the information stored in address book 124 in one embodiment. Thus, our invention contemplates more than an annunciation of a generic name or directory service. Rather, it contemplates an ability to preserve a user's individuality and custom settings, and builds on this to enable further personalization so that he or she is capable of configuring a personalized greeting when retrieving a voicemail left for him or her.

Application 126 takes the form of a set of computer-executable instructions that interact with application 118 to enable the various functional aspects described herein.

In operation, source calling device 110 attempts to reach recipient device 112, but cannot. Thus, a voicemail message is left on voicemail server (or on some other storage device coupled to voicemail server 116), which also receives identifier 128, which identifies source device 110. Identifier 128 is the same as identifier 122, but separate referencing roles are used so as to ease explanation of the drawing.

In one embodiment, application 118 facilitates the passing of the caller's identifier 130 to target device 112. Application 126 receives identifier 130 and determines, if applicable, a custom name in address book 124 that corresponds to identifier 130 (again, which is the same as identifier 122 in one embodiment). If no match is found, that is communicated back to voicemail server 116. If a match is found, then a custom name 132 is returned to voicemail server 116, and received by application 118, which then stores the custom name 134 to be used with a custom greeting. Accordingly, when the user associated with device 112 attempts to check his/her voicemail, he/she will be presented with a custom greeting based on information 134. Continuing with the prior example, when the user of device 112 retrieves his/her voicemail, instead of being presented with a generic greeting that lists the time and phone number, for example, he/she might be greeted with the following: "You received a call from my best friend . . . . " If target device 112 had been configured to associate a different name with the same phone number, then that name would have been presented instead of "my best friend." The custom greeting can be a synthetically generated annunciation that recites the custom name.

A user can even configure a custom greeting to be played when no match is found in address book 124. For example, a user might indicate a desire to have "someone you do not know" be played when they receive a voicemail from someone who is not in their address book 124. In still other embodiments, the custom greeting can actually come from the caller. That is, it could be a caller-generated message that was provided by a caller who left the voicemail. The caller could be prompted to leave a brief custom announcement, and if the recipient has so configured his voicemail, then that announcement will be played.

Figure 3:
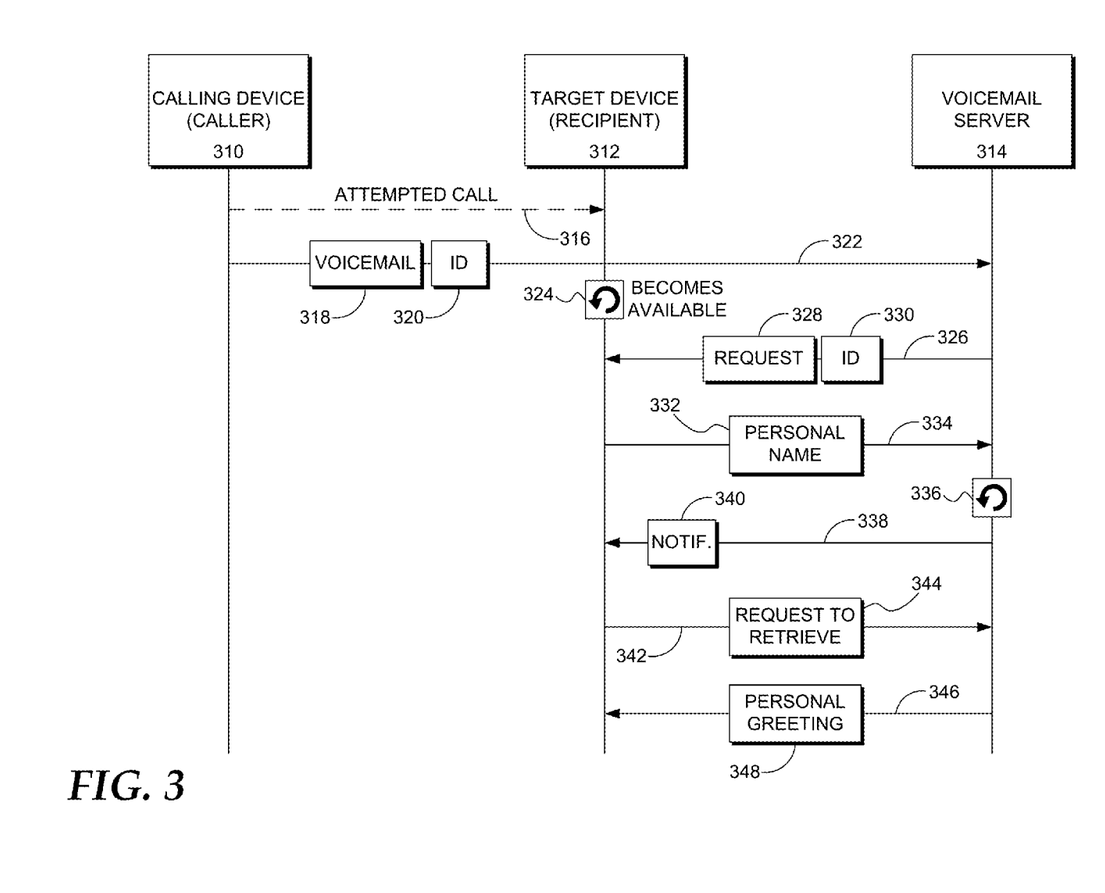
FIG. 3 depicts an illustrative dataflow in accordance with an embodiment of the present invention.

Turning now to FIG. 3, another illustrative flow is provided according to an embodiment of the present invention. FIG. 3 includes a calling device 310, a target device or recipient 312, and a voicemail server 314. At a step 316, from calling device 310 an attempt to call target device 312 is made. Because target device 312 is currently unavailable, a voicemail 318 and device identifier 320 are communicated to voicemail server 314 at a step 322. ID 320 identifies calling device 310. Target device 312 might have been unavailable because it was out of range, not accepting calls, turned off, or just unanswered. At some point, target device 312 becomes available at a step 324, at least available enough for a wireless telecommunications network to communicate with it. In one embodiment, a wireless telecommunications network utilizes a signaling protocol to communicate with calling device 310. In other embodiments, a data session might be established, but as previously mentioned, signaling can also be used to accomplish the address-book inspection in the background; that is, while the user is unaware.

Thus, at a step 326, voicemail server 314 communicates a request 328 as well as an identifier 330 to target device 312. Request 328 is a request for address-book information stored in an address book or similar data store of target device 312 (such as address book 124). Identifier 330 identifies calling device 310. An address book of target device 312 is inspected for a personal name based on identifier 330. If a personal name is found, then the personal name 332 is communicated to voicemail server 314 at a step 334.

At a step 336, voicemail server 314 is configured to present a personalized greeting through the use of target device 312 when the user retrieves his/her voicemail. In one embodiment, this includes transforming a generic greeting into a personalized greeting. At a step 338, a notification 340 is sent to target device 312 thereby indicating that a new voicemail has been received. In some embodiments, a notification message such as notification 340 is not provided. We do not mean to imply a specific order of the various steps that we are describing, but are merely providing an illustrative flow to help provide context to the invention.

At a step 342, voicemail server 314 receives a request 344 to retrieve voicemail associated with target device 312. Although FIG. 3 seems to indicate that a request originates from target device 312, it only does so in one embodiment. The user associated with target device 312 might retrieve his/her voicemail any number of ways and use any number of devices. At a step 346, the user of target device 312 is presented with a personal greeting 348 based on the personal name 332 retrieved at step 334. Instead of receiving a message that merely indicates a phone number, voicemail server 314 will facilitate announcing a personal name associated with the leaver of the voicemail.

Figure 4:
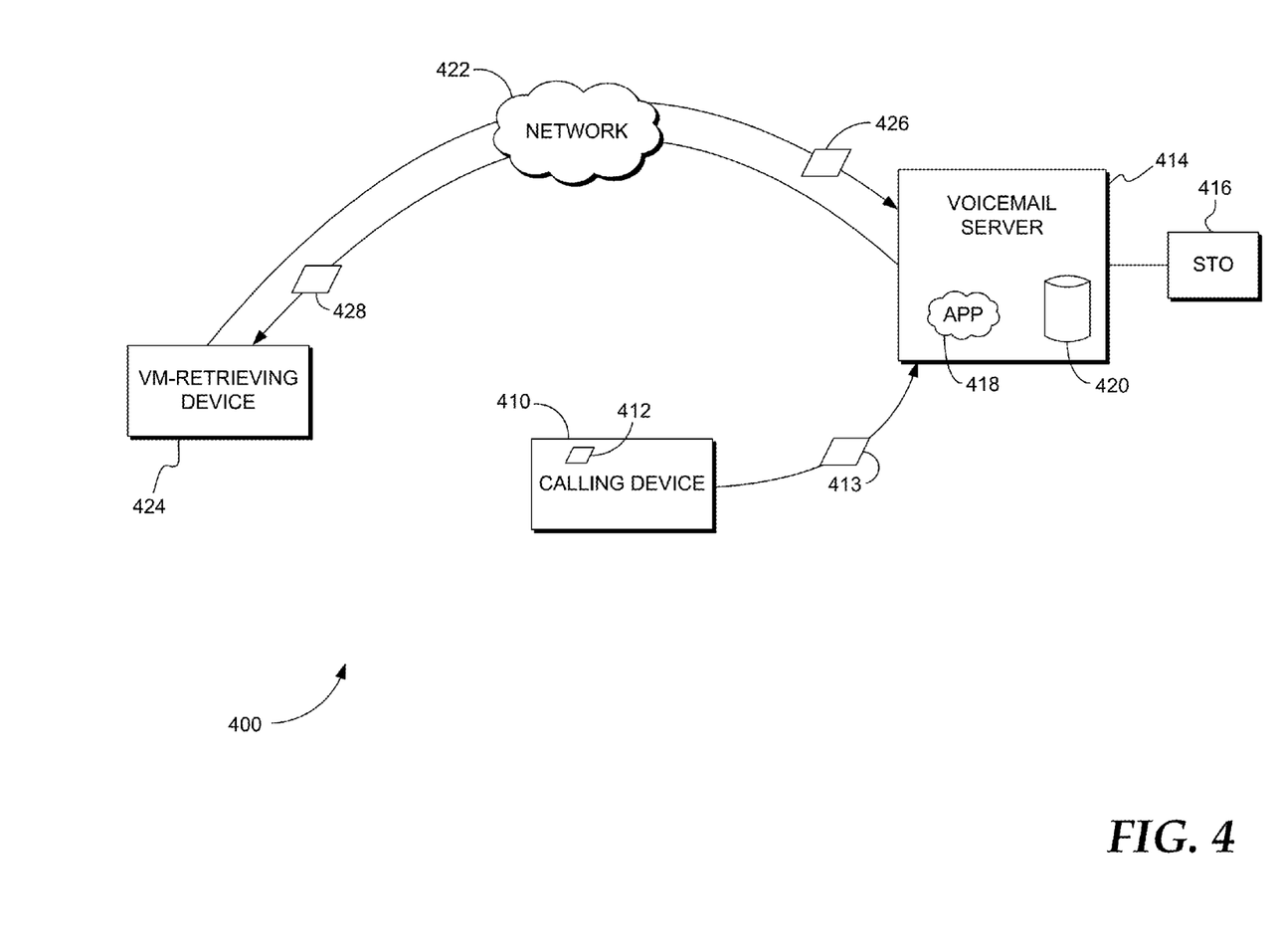
FIG. 4 depicts another illustrative operating environment suitable for practicing an embodiment of the present invention.

Turning now to FIG. 4, another illustrative operating environment is provided and referenced generally by the numeral 400. A calling device 410 is associated with a unique identifier 412 that is capable of identifying it. This calling device 410 might be a mobile phone, standard phone, internet phone, etc. After or in connection with leaving a voicemail by way of voicemail server 414, calling device 410 communicates its identifier 413 to voicemail server 414. In one embodiment, the messages are stored in a storage component 416 that is coupled to voicemail server 414, which includes an application 418 that carries out various functional aspects of the present invention as well as a network address book 420, which stores contact information associated with a given user. In this embodiment, the user might have locally stored information in his/her mobile device, but also might utilize a network address book. The network address book will store information similar to that stored in address book 124, but be located within or coupled to network 422, which might be a wireless telecommunications network or the PSTN. Although the network address book 420 is shown in the same block as voicemail server 414, it does not need to form a part of voicemail server 414. Network address book 420 might be coupled to voicemail server 414 in some embodiments.

A user utilizes a voicemail-retrieving device 424 to submit a request 426 to retrieve any voicemail messages left for him/her. The voicemail-retrieving device 424 might be a standard phone, mobile phone, or any phone usable to reach voicemail server 414. In this embodiment, there was no need for voicemail server 414 to inspect an address book within voicemail-retrieving device 424. Rather, voicemail server 414 was able to utilize identifier 413 to inspect network address book 420 in order to determine a personalized greeting 428 that is to be presented to a user. In this way, when a user retrieves his/her voicemail, voicemail server 414 will facilitate announcing a user-customized greeting before, during, or after presenting the corresponding voicemail message.

Figure 5:
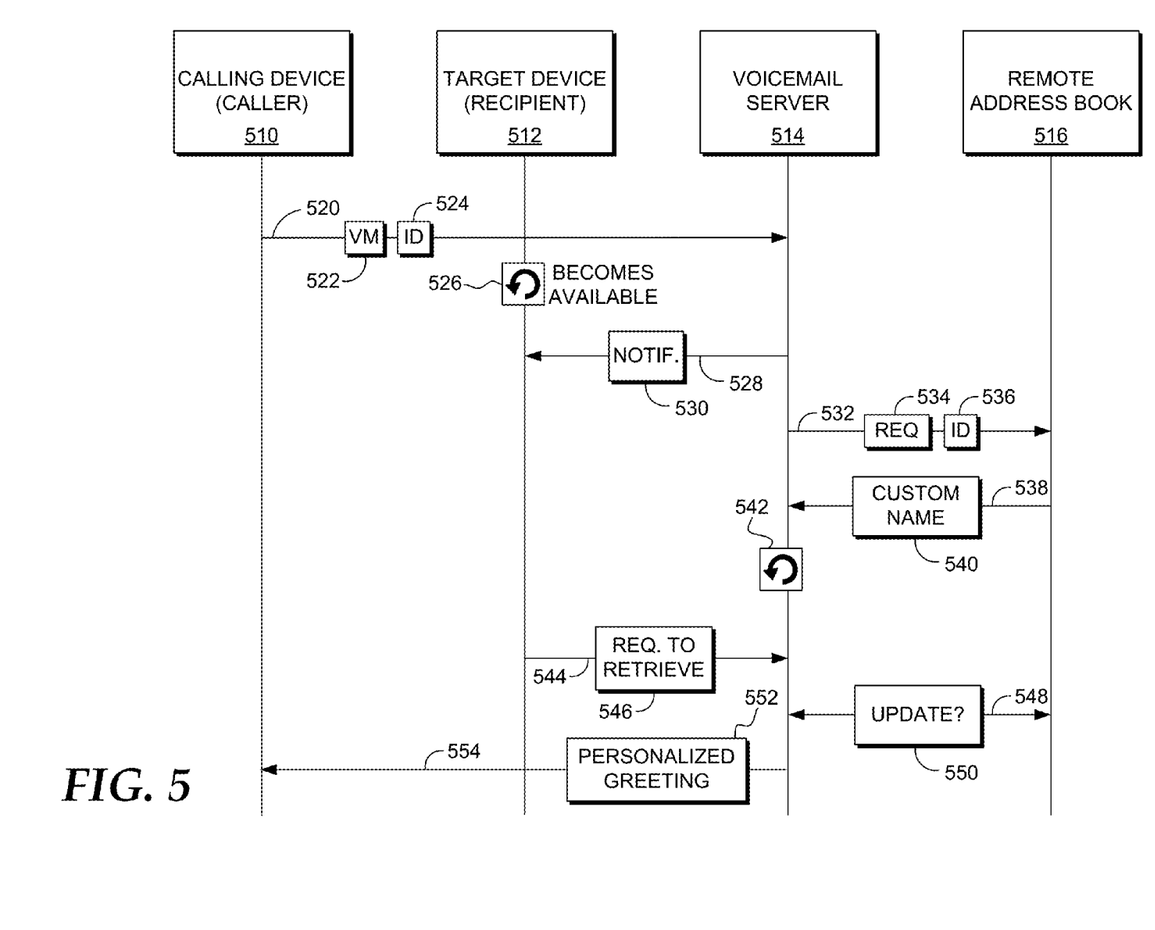
FIG. 5 depicts another illustrative flow in accordance with an embodiment of the present invention.

Turning now to FIG. 5, another illustrative flow according to an embodiment of the present invention is provided. FIG. 5 depicts a calling device 510, a target device 512, a voicemail server 514, and a remote address book 516. In one embodiment, calling device 510 is associated with a caller, target device 512 is associated with an intended recipient of a voicemail message, voicemail server 514 is similar in nature to the previous voicemail servers that we have discussed, and remote address book 516 contains personalized contact information provided by the recipient or owner of target device 512. At a step 520, a voicemail 522 and calling-device identifier 524 are communicated to voicemail server 514. Identifier 524 identifies calling device 510. Later, this identifier will be used to inspect remote address book 516 to locate a custom name or other string associated with calling device 510. At a step 526, target device 512 becomes available. That is, in one embodiment, target device 512 takes the form of a mobile communications device that operates by way of a wireless telecommunications network. It might have previously been inaccessible by the network, but becomes accessible at a step 526.

The order of the following steps, as well as other steps previously mentioned, is not limited to the order that we describe. For example, at a step 528, we show a notification 530 being communicated from voicemail server 514 to target device 512. But this does not need to occur prior to voicemail server 514 submitting at a step 532 a request 534 for personalized content information stored in address book 516. As previously mentioned, remote address book 516 is inspected based on an ID 536, which is the same as ID 524, but referenced with a separate numeral to ease explanation in connection with the drawing. At a step 538, a custom name 540 is indicated to voicemail 514 that it should be presented when the owner of target device 512 attempts to retrieve his/her voicemail.

In one embodiment, what was formerly a generic message greeting is transformed at a step 542 to a custom greeting. In other embodiments, the presentation happens on the fly or in real time such that when the owner of target device 512 contacts voicemail server 514, voicemail server 514 retrieves custom-name information 540 and presents a custom greeting. Thus, in one embodiment, at a step 544, which might occur soon or at a distant time, voicemail server 514 receives a request 546 to retrieve or listen to any voicemail messages that were stored by way of voicemail server 514. In some embodiments, voicemail server 514 inspects remote address book 516 at a step 548 to see whether any updates 550 have occurred. It might be the case that the owner of target device 512 has modified the custom name 540 associated with identifiers 536 and 524. If this is the case, then an embodiment of the present invention contemplates checking to see whether such an update has been provided, and if so, then presenting the updated personalized greeting 552 at a step 554. If the custom name had not changed, then the personalized greeting 552 would have been based on custom name 540. In other embodiments, remote address book 516 pushes to voicemail server 514 an indication that update 550 has occurred. In this embodiment, voicemail server 514 does not need to inspect remote address book 516 but rather relies on receiving an indication from remote address book 516.

In some embodiments, the update received from remote address book 516 is the actual update itself, but in other embodiments, update 550 takes the form of an indication that an update has occurred, thereby equipping voicemail server 514 with knowledge to inspect remote address book 516.

Figure 6:
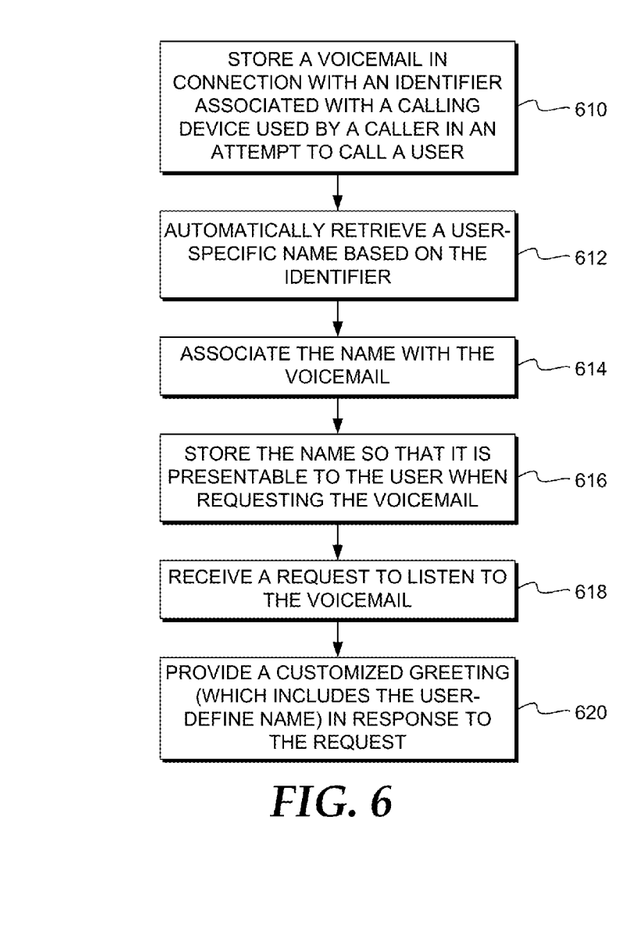
FIGS. 6-8 depict flow diagrams that provide illustrative methods for presenting a customized greeting to a retriever of a voicemail in accordance with various embodiments of the present invention.

Turning now to FIG. 6, an illustrative method for presenting a custom greeting to a user who retrieves a voicemail that is left by a caller is provided. At a step 610, a voicemail message is stored in connection with an identifier associated with a calling device used by a caller in an attempt to call a user. As previously mentioned, this might take the form of storing a phone number or other device identifier with the voicemail, which may be stored in a voicemail server or in a data store coupled to a voicemail server. At a step 612, a user-specific name is automatically retrieved based on the identifier. In one embodiment, this includes inspecting a mobile device associated with the user. In other embodiments, this contemplates inspecting a remote address book (that is remote with respect to the user), which is accessible by voicemail server 514 independently of whether a target device owned by the user is accessible.

At a step 614, the custom name or string retrieved is associated with a voicemail. Again, this name is not merely the actual name associated with a calling device that was used to leave a message. That is, perhaps a given calling device is owned by a John Smith. Perhaps public directories indicate that John Smith is associated with a given calling device that was used to leave a voicemail message. Embodiments of the present invention contemplate more than merely announcing "John Smith." Rather, if a user has opted to identify a custom string in association with the identifier that identifies the calling device, then that custom string will be presented irrespective of what public or other databases store. In this way, a user's personalization is able to be maintained.

At a step 616, the name is stored so that it is presentable to the user when requesting the voicemail. As mentioned, the name can be stored in voicemail server 514 on a data store coupled to voicemail server 514. At some point, the voicemail server receives a request to listen to the voicemail at a step 618, whereby at a step 620 it provides a customized greeting in response to the request. The customized greeting is based on the user-defined name that resided either in the remote address book or the local address book that was local to the target device owned by the intended recipient of the voicemail message.

Figure 7:
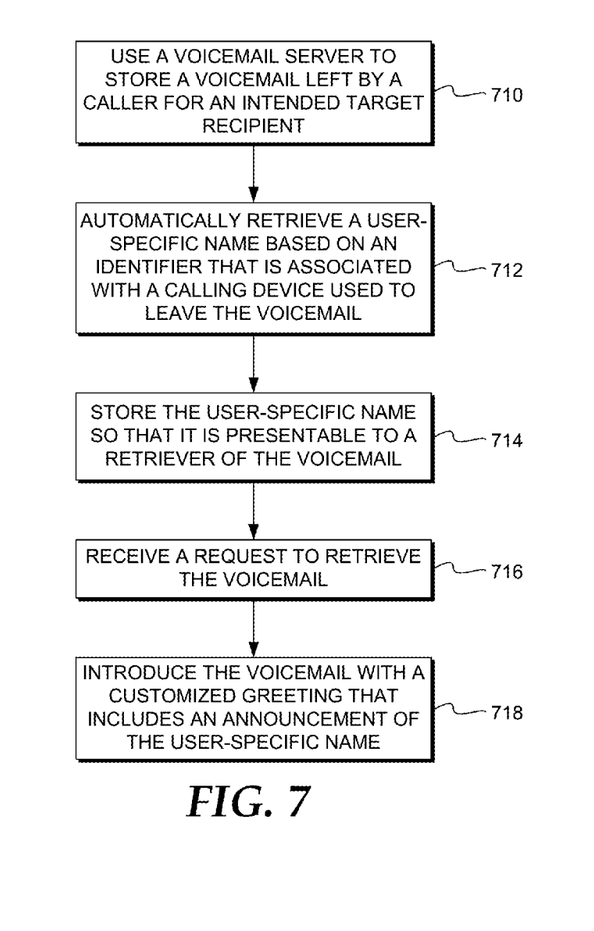

Turning now to FIG. 7, another illustrative method for presenting a custom greeting to a user is provided. At a step 710, a voicemail server is used to store a voicemail that was left by a caller for an intended target recipient. At a step 712, the voicemail server automatically retrieves a user-specific name based on an identifier that is associated with a calling device used to leave the voicemail. In one embodiment, this includes referencing a first database on the voicemail server that stores the user-specific name. In other embodiments, this includes referencing a database coupled to the voicemail server. In still other embodiments, this includes referencing a mobile device associated with a target recipient, in which the mobile device stores contact information defined by the recipient.

At a step 714, the user-specific name is stored so that it is presentable to a retriever of the voicemail. That is, when the user calls to retrieve a voicemail, a personalized greeting can be announced. Thus, at a step 716, the voicemail server receives a request to retrieve the voicemail. And at a step 718, the voicemail is introduced with a customized greeting that includes an announcement of the user-specific name.

Figure 8:
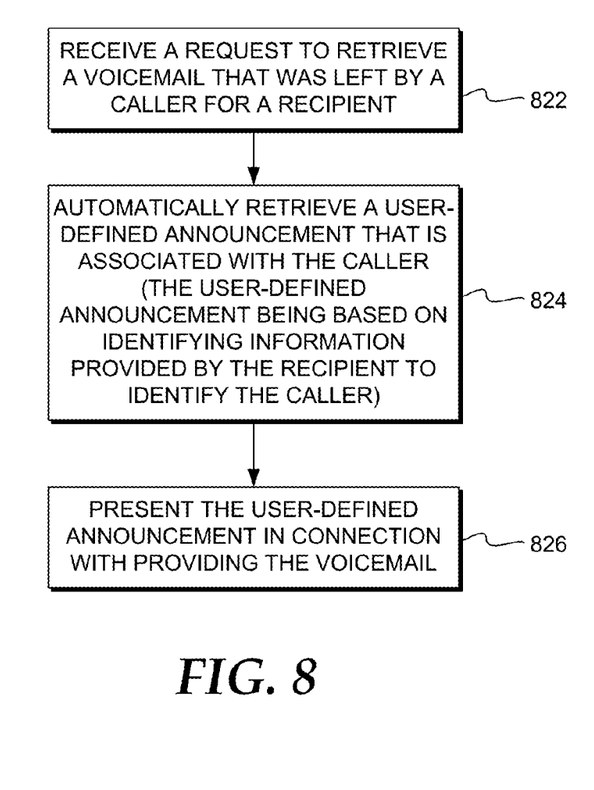

Turning now to FIG. 8, another illustrative method for presenting a customized greeting to a user is provided. At a step 822, a request is received to retrieve a voicemail that was left by a caller for a recipient. The voicemail was stored by way of a voicemail server. At a step 824, a user-defined announcement is automatically retrieved that is associated with the caller. The user-defined announcement was based on identifying information that was provided by the recipient to identify the caller. As mentioned, it is the user, or person who will be retrieving the voicemail, who provides or indicates the announcement, which can take the form of a custom string that is automatically announced when the user retrieves his/her voicemail.

At a step 826, the user-defined announcement is presented in connection with providing the voicemail to the voicemail retriever. As mentioned, automatically retrieving a user-defined announcement might include getting the identifying information from a mobile device associated with the recipient. This might include establishing a communications link with the mobile device through a wireless telecommunications network to retrieve the identifying information. Further, the communications link can be established by way of a data session or, in some embodiments, by way of a signaling protocol in which signaling is utilized to retrieve the identifying information.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:
1. One or more non-transitory computer-readable media having computer-executable instructions embodied thereon that, when executed, cause a voicemail server to perform a method of presenting a custom greeting to a user who retrieves a voicemail that was left by a caller, the method comprising:
  employing a voicemail server to store a voicemail left by a caller for an intended target recipient;
  automatically retrieving a user-specific name based on an identifier that is associated with a calling device used to leave the voicemail, wherein the user-specific name is defined by the target recipient and stored in an address book application of the target recipient's communication device such that the address book application searches for a match with the identifier:
    upon locating the user-specific name, transmits the user-specific name to the voicemail server, but
    when a match is not found, providing an indication that the identifier is not in the address book of the target recipient; and
  storing the user-specific name or the indication such that it is presentable to a retriever incident to a request to retrieve the voicemail, wherein the retriever is the target recipient and the user-specific name or indication is annunciated before rendering the voicemail.

2. The media of claim 1, wherein the identifier includes one or more of:
   a phone number;
   a mobile device number (MDN); and
   an electronic serial number (ESN).

3. The media of claim 1, wherein automatically retrieving the user-specific name is accomplished by at least one of the following ways:
   referencing a first database on the voicemail server, wherein the first database stores the user-specific name;
   referencing a second database coupled to the voicemail server, wherein the second database stores the user-specific name; and
   referencing a mobile device associated with the target recipient, wherein the mobile device stores the user-specific name.

4. The media of claim 1, further comprising receiving from a retriever a request to retrieve the voicemail.

5. The media of claim 4, further comprising introducing the voicemail with a customized greeting that includes an audio announcement of the user-specific name.

6. The media of claim 5, wherein the audio announcement includes one or more of the following:
   a synthetically generated announcement; and
   a caller-generated message that was provided by a caller who left the voicemail.

7. The media of claim 6, wherein the caller-generated announcement is provided when the user-specific name is not located.

8. One or more non-transitory computer-readable media having computer-executable instructions embodied thereon that, when executed, cause a voicemail server to perform a method of presenting a custom greeting to a user who retrieves a voicemail that was left by a caller, the method comprising:
   receiving a request to retrieve a voicemail that was left by the caller for a recipient, wherein the voicemail was stored by way of a voicemail server;
   automatically retrieving a user-defined announcement that is associated with the caller, wherein the user-defined announcement is based on identifying information provided by the recipient to identify the caller, and wherein automatically retrieving the user-defined announcement comprises obtaining the identifying information for the caller from a communication device associated with the recipient; and
   presenting the user-defined announcement in connection with presenting the voicemail, wherein the voicemail server confirms that the identifying information is current by inspecting an address book remotely stored on the communication device associated with the recipient of the voicemail.

9. The media of claim 8, wherein the communication device is a mobile device associated with the recipient.

10. The media of claim 9, wherein getting the identifying information includes establishing a communications link with the mobile device through a wireless telecommunications network to retrieve the identifying information.

11. The media of claim 10, wherein the communications link is established by one or more of the following ways:
    by way of a data session; and
    by way of a signaling protocol wherein signaling is utilized to retrieve the identifying information.

12. A computer-implemented method of presenting a custom greeting to a user who retrieves a voicemail that was left by a caller, the method comprising:
    employing a voicemail server to store a voicemail left by a caller for an intended target recipient;
    automatically retrieving a user-specific name based on an identifier that is associated with a calling device used to leave the voicemail, wherein the user-specific name is defined by the target recipient and automatically retrieving the user-specific name is accomplished by at least one of the following ways:
    (1) referencing a first database on the voicemail server, wherein the first database stores the user-specific name,
    (2) referencing a second database coupled to the voicemail server, wherein the second database stores the user-specific name, or
    (3) referencing a mobile device associated with the target recipient, wherein the mobile device stores the user-specific name; and
    storing the user-specific name such that it is presentable to a retriever incident to a request to retrieve the voicemail such that discrepancies in the user-specific name provided by the first or second database are updated based on the user-specific name stored by the target recipient mobile device.

13. The method of claim 12, further comprising receiving from a retriever a request to retrieve the voicemail.

14. The method of claim 13, further comprising introducing the voicemail with a customized greeting that includes an audio announcement of the user-specific name.

15. The method of claim 14, wherein the audio announcement includes one or more of the following:
    a synthetically generated announcement; and
    a caller-generated message that was provided by a caller who left the voicemail.

16. The method of claim 15, wherein the user-specific name is configured for presentation when the retriever matches the target recipient.

17. The method of claim 12, wherein the user-specific name momentarily replaces caller identity information for the caller available from sources other than the target recipient.

18. The method of claim 12, wherein in response to a request to retrieve the voicemail for the caller, presenting the user-specific name to the target recipient.

19. The method of claim 12, wherein contacts for the target recipient are matched to the identifier for the caller.

20. The method of claim 19, wherein a name for the matching contact is stored as the user-specific name.

* * * * *